UNITED STATES PATENT OFFICE 2,046,160

HYDROGENATED RUBBER AND A PROCESS FOR PRODUCING SAME

George De Witt Graves, Wilmington, Del., assignor to E. I. du Pont de Nemours & Company, Wilmington, Del., a corporation of Delaware No Drawing. Application June 2, 1933, Serial No. 674,044

9 Claims. (Cl. 260—1)

This invention relates to the art of hydrogenating rubber and, more particularly, it pertains to the catalytic liquid phase hydrogenation of rubber and related polymeric unsaturated hydrocarbons in polynuclear solvents, such as decahydronaphthalene.

The catalytic hydrogenation of rubber generally is known to the art. The prior processes of this field, however, yield products which are unsatisfactory for many purposes, and the processes are difficult to regulate, yielding undesirably colored and degraded products.

It is the object of the present invention to provide a practical process for the rapid hydrogenation of rubber and related polymeric unsaturated hydrocarbons to produce, by liquid phase reduction, partially or completely hydrogenated products of good quality and utility. A further object of the invention resides in the use of hydrogenated polynuclear solvents in the process. A more specific object relates to the use of decahydronaphthalene as a solvent. Other objects will appear from the following description of the invention.

In general the invention is carried out by dissolving rubber or related material in a saturated polynuclear hydrocarbon solvent such as decahydronaphthalene, subjecting this solution to hydrogenation at elevated temperatures and pressures in the presence of a hydrogenating catalyst, whereupon the hydrogen adds to the unsaturated bonds to partially or completely saturate the molecule, without undue degradation of the rubber.

The following examples illustrate various embodiments of the invention. These examples are illustrative only and are not to be regarded as limitations of the invention.

Example I

Seven hundred grams of milled pale crepe rubber cut in small pieces, 3100 grams of decahydronaphthalene and 206 grams of a reduced nickel catalyst were charged into a pressure vessel equipped with a stirrer and a cooling coil. The catalyst was prepared by the precipitation of nickel carbonate on kieselguhr, followed by reduction with hydrogen and after reduction contained 20% metallic nickel. Hydrogen was introduced to a pressure of 2000 pounds and the contents of the vessel were stirred while being heated. Reduction occurred at 270° C. with the evolution of heat and the temperature was maintained at 270–280° C. by means of cooling. Hydrogen was introduced periodically to replenish that used in the reaction, and hydrogen absorption was complete in about two and one-half hours. After the reaction mixture was cooled to room temperature, the viscous solution was diluted with one or more times its volume of benzene and the catalyst removed by filtration. The solvent was then removed as far as possible by vacuum distillation at 100° C. and the final portions separated from the product by steam distillation. Six hundred forty grams of completely hydrogenated rubber were obtained as a colorless, very viscous liquid.

Example II

One thousand grams of an unsaturated polymerized hydrocarbon known commercially as "Thermoprene" and prepared by heating rubber in the presence of benzene sulphonic acid, were dissolved in 4,000 cc. of decahydronaphthalene and the solution charged into a pressure vessel with 300 grams of a reduced nickel catalyst comprising 20% metallic nickel supported on kieselguhr. Hydrogen was introduced to a pressure of 3800 pounds and the contents of the vessel were heated and stirred rapidly, with reduction occurring at 300–325° C. Hydrogen was introduced periodically to replenish that used in the reaction, and absorption was complete in five hours. The solution was filtered to remove the catalyst and the decahydronaphthalene was distilled off. About 900 grams of completely hydrogenated "Thermoprene", a glass-clear, brittle resin were obtained.

The hydrogenation of the material used in the above example and termed "Thermoprene" is preferably accomplished at temperature of 300–325° C. and under a pressure of 200–300 atmospheres, but these conditions can be varied to a certain extent.

Example III

Fifty grams of milled pale crepe rubber, 225 grams of decahydronaphthalene and 15 grams of a catalyst comprising 20% reduced nickel supported on kieselguhr was charged into a pressure vessel and shaken under 3400 lbs. hydrogen pressure. Absorption of hydrogen began at 270° C. and the reduction was continued for about three quarters of an hour at 275° C. The reaction was then stopped by cooling. After diluting the reaction mixture, filtering off the catalyst, and evaporating off the solvent, partially hydrogenated rubber was obtained as an opaque, gray, sticky substance which had an iodine number of about 180.

The success of the process depends to a large extent on the efficiency with which the catalyst, the solution of the rubber and the hydrogen gas are brought into contact. Proper agitation may be effected by internal stirring as in an autoclave, or the entire vessel may be agitated externally. In fact, any method whereby the gas, liquid and catalyst are brought into intimate contact will expedite the reaction.

The method for the preparation of hydrogenated rubber is capable of variation. In decahydronaphthalene solution the temperature of about 270° C. is fairly specific for initial rapid reduction, although slower reduction will take place at as low as 240° C. This reduction may be carried on as high as 350° C., although the products obtained at this temperature are very sticky and in a further state of degradation than those reduced at a lower temperature. The relatively large proportion of catalyst in the above examples is used to make the reaction time as brief as possible. Similarly, the use of moderately high pressures is advantageous because it increases the rate of hydrogenation. It is preferred to operate at pressures above 2000 pounds, but reduction at a slower rate takes place at pressures as low as 750 pounds. The upper limit of pressure is, of course, limited only by the strength of the reaction vessel. Proportions of rubber and solvent other than those given may be used successfully in this reaction, but the amount of solvent present should be sufficient to dissolve the rubber. Unsupported catalysts, prepared by the reduction of metals, are generally less satisfactory because they are easily sintered during the reduction step, with resulting loss of activity. It is preferable, therefore, to use catalysts precipitated on any of the well-known supporting materials such as pumice, silica gel, carbon, kieselguhr, fuller's earth, etc.

Also, metallic nickel supported on chromium oxide is a catalyst that may be used. While metallic nickel catalysts of the type described represent the preferred form of catalyst, it will be understood that there are other catalysts which hydrogenate satisfactorily, for example, metallic iron or metallic cobalt preferably supported on an inert carrier.

Other compounds which may be hydrogenated by the process of this invention include polymeric rubber hydrocarbons such as raw rubber, gutta percha, balata, polymerized butadiene, synthetic rubbers, etc. Other solvents which may be used include alkyl substituted decahydronaphthalenes such as methyl or ethyl decahydronaphthalenes, hydrogenated anthracenes and phenanthrenes in their liquid state, and saturated polynuclear hydrocarbons in general. These saturated polynuclear compounds, which have the effect of facilitating the hydrogenation of rubber, may be used in combination with other solvents for rubber such as cyclohexane and aliphatic hydrocarbons.

Completely hydrogenated rubber as prepared by my process is suitable for a transformer liquid, as an insulating material for submarine cables, in combination with waxes as a moistureproofing agent for shot gun shells, as a modifying agent for a wax in automobile polishes, as a waterproof adhesive, as a constituent of varnish removers, as an acid-proof cement, as an impregnating agent alone or in combination with other materials for the preparation of water-proof cloth, etc. Partially hydrogenated rubber may be used as an adhesive. Rubber hydrogenated to the extent of about 25% may be vulcanized to a soft rubber which is useful for printers' rolls, liners for moving picture cameras and as cushions to absorb vibrations. Hydrogenated Thermoprene may be used in lacquers, paints, varnishes, as an adhesive, etc.

An advantage of this invention is that it provides a rapid practical method for the preparation of hydrogenated rubber. Decahydronaphthalene acting presumably as a hydrogen transfer medium aids in the transfer of hydrogen to the rubber molecule and by its solvent effect brings about more intimate contact of the rubber with the hydrogenating agent. Hydrogenation of rubber in solvents other than those of the saturated polynuclear type results in extensive degradation of the rubber molecule without effecting complete saturation. Experimentally, cyclohexane at 300° C. and 2000–3000 lbs. hydrogen pressure yielded an unsaturated oil of the consistency of light lubricating oil instead of the colorless, transparent, very viscous, completely hydrogenated rubber which is obtained with decahydronaphthalene under these conditions. From the decahydronaphthalene solution of hydrogenated rubber the catalyst may be easily removed by filtering or centrifuging. In this process, furthermore, it is not necessary to dissolve the rubber before hydrogenation. Rubber charged into a pressure vessel separately with solvent and catalyst forms a complete solution under the influence of heat by the time the temperature of hydrogenation has been reached.

By the expression "rubber" and "polymeric rubber hydrocarbon" as used in the specification and the claims I mean when the expressions are otherwise limited to include rubber and related substances in forms suitable for hydrogenation, such as gutta perch, balata, synthetic rubber produced from unsaturated hydrocarbons, such as butadiene and isoprene, and rubber derivatives such, for example, as that produced by heating rubber in the presence of benzene sulfonic acid. I do not mean to include rubber which has been altered by chemical treatment to a form not readily hydrogenated, as vulcanized rubber or rubber containing a substantial proportion of sulfur.

The above descriptions and specific examples are given by way of illustration only and are not to be construed as limiting the scope of the invention. Any variation therefrom which conforms to the spirit of the invention is intended to be included within the scope of the claims.

I claim:

1. The process of producing hydrogenated rubber materials which comprises subjecting rubber to the action of hydrogen at a pressure in excess of 750 pounds per square inch and at a temperature of 240–350° C., in solution in a saturated polynuclear hydrocarbon selected from the group consisting of decahydronaphthalene, methyl decahydronaphthalene, ethyl decahydronaphthalene, hydrogenated anthracene, hydrogenated phenanthrene and in the presence of a hydrogenating catalyst.

2. The process of producing hydrogenated rubber which comprises subjecting polymeric rubber hydrocarbon to the action of hydrogen under a temperature of 240–350° C. and a pressure in excess of 750 pounds per square inch in solution in a rubber solvent comprising decahydronaphthalene.

3. The process of producing hydrogenated rubber materials which comprises subjecting rubber to the action of hydrogen at a pressure in excess of 750 pounds per square inch and at a temperature of 240–350° C., in solution in a saturated polynuclear hydrocarbon selected from the group consisting of decahydronaphthalene, methyl decahydronaphthalene, ethyl decahydronaphthalene, hydrogenated anthracene, hydrogenated phenanthrene and in the presence of a hydrogenating catalyst taken from the class consisting of the metals, nickel, iron and cobalt.

4. The process of producing hydrogenated rubber materials which comprises subjecting rubber to the action of hydrogen at a pressure in excess of 750 pounds per square inch and at a temperature of 240–350° C., and in the presence of a saturated polynuclear hydrocarbon selected from the group consisting of decahydronaphthalene, methyl decahydronaphthalene, ethyl decahydronaphthalene, hydrogenated anthracene, hydrogenated phenanthrene, in the presence of a hydrogenating nickel catalyst.

5. The process of claim 4, characterized in that the rubber material treated is natural unvulcanized rubber.

6. The process of claim 1 in which the operation is continued to substantially complete hydrogenation of the rubber.

7. The process of producing hydrogenated rubber materials which comprises subjecting rubber to the action of hydrogen at a pressure in excess of 750 pounds per square inch and at a temperature of 240–350° C., in solution in decahydronaphthalene and in the presence of a hydrogenating catalyst.

8. In the process of catalytically hydrogenating at an elevated temperature and pressure a polymeric rubber hydrocarbon in solution in a rubber solvent, the improvement characterized in that the rubber solvent is selected from the group consisting of decahydronaphthalene, methyl decahydronaphthalene, ethyl decahydronaphthalene, hydrogenated anthracene, hydrogenated phenanthrene.

9. In the process of catalytically hydrogenating at an elevated temperature and pressure a polymeric rubber hydrocarbon in solution in a rubber solvent, the improvement characterized in that the rubber solvent is decahydronaphthalene.

GEORGE DE WITT GRAVES.